United States Patent
Annamalai et al.

(10) Patent No.: US 6,798,168 B1
(45) Date of Patent: Sep. 28, 2004

(54) BATTERY WITH REDUCED SPECIFIC ABSORPTION RATE PROPERTIES

(75) Inventors: Macwien Krishnamurthi Annamalai, Petaling Jaya (MY); Jauhari Abd Ghafar, Butterworth (MY); Suang Tien Ho, Perai (MY); Kok Hiong Sim, Sg.Nibong (MY)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/421,269

(22) Filed: Apr. 23, 2003

(51) Int. Cl.$^7$ .............................................. H01M 10/46
(52) U.S. Cl. ...................................................... 320/112
(58) Field of Search ................................. 320/107, 110, 320/112, 114; 343/700 R, 702; 455/128, 129

(56) References Cited

U.S. PATENT DOCUMENTS 5,575,682 A * 11/1996 Alexander ................... 439/500
5,970,393 A * 10/1999 Khorrami et al. ............ 455/129
2004/0046701 A1 * 3/2004 Huber et al. ................. 343/702

* cited by examiner

Primary Examiner—Edward H. Tso
(74) Attorney, Agent, or Firm—Philip H. Burrus, IV

(57) ABSTRACT

A battery pack for an electronic communications device having electronic circuitry, at least one rechargeable cell, a housing and a circuit substrate is provided. Included within the pack is a copper strip that is electrically isolated from the battery circuitry. The copper strip is tuned by adjusting the length and width of the strip, as well as the placement of the strip within the battery pack, so as to reduce the overall Specific Absorption Rate (SAR) of the communications device-battery combination. In one preferred embodiment, the copper strip is 70 mm by 3 mm, made from 1 oz. copper, and formed into a "L" shape. The copper strip is placed along the side of the cell and about the end having the positive terminal. Overall SAR is reduced 13% by using the battery with the copper strip.

9 Claims, 3 Drawing Sheets

BATTERY WITH REDUCED SPECIFIC ABSORPTION RATE PROPERTIES

BACKGROUND

1. Technical Field

This invention relates generally to batteries for portable communications devices, and more specifically to batteries for portable communications devices that help reduce the macroscopic SAR level for a given power transmission level.

2. Background Art

All wireless communications devices, be they cellular phones, pagers, radios or other devices, include at least two components: a battery and a radio-frequency (RF) communications module. The battery, which is often rechargeable, provides portability for the device. The RF module allows the device to communicate with networks and other devices through radio waves transmitted and received with the device's antenna.

When the RF module is transmitting, a power amplifier magnifies an electronic signal and then broadcasts this modulated energy into the air through the antenna. Some of this energy travels through free space to the target destination. Some of this energy is dissipated as heat within the device. Some of the energy is absorbed by objects near the device, including the user's body.

Both governmental and standards organizations have set limits for maximum levels of power that may be absorbed by a person using the device. Specifically, the Federal Communications Commission (FCC) has set forth rules and regulations relating to RF exposure from communications devices. The rules are based upon input from independent scientific organizations. In particular, these regulations place limits on the SAR, or Specific Absorption Rate. The SAR is a measurement of RF energy absorbed by the body when using a communications device. When a communications device is operating within the FCC SAR limits, scientific panels, government agencies, public health authorities and standards bodies, including the U.S. Food and Drug Administration and the World Health Organization, all agree that electronic devices pose no hazards to users.

The SARs for various manufacturers' phones can be different. This is due in part to the fact that SAR is a function of many different parameters, including device geometry, transmission frequency, amplifier power level, antenna location, etc. Engineers often refer to SAR issues as "black magic" because it is very difficult to derive mathematical equations that accurately predict SAR due to the many parasitic components in a phone that affect high-frequency RF transmission. One thing is certain, however: lower SAR device configurations are preferable because they both improve performance and extend battery life. Consider the following hypothetical example.

Imagine that the SAR limit is, for discussion purposes, 10. If two phones have different "SAR profiles", the power levels of the power amplifiers must be set differently in each phone. If one phone has a "noisy" SAR profile, the power levels in that phone must be set lower that that in a phone with a "quiet" SAR profile to achieve the same macroscopic limit of 10. Having a lower power level is disadvantageous because the maximum distance from a base station within which the phone can communicate is reduced. Additionally, as the quiet SAR profile phone will generally operate in the field at less than maximum power, battery life is extended.

There is thus a need for an apparatus that reduces the macroscopic SAR level of communications devices.

DETAILED DESCRIPTION OF THE INVENTION

Figure 1:
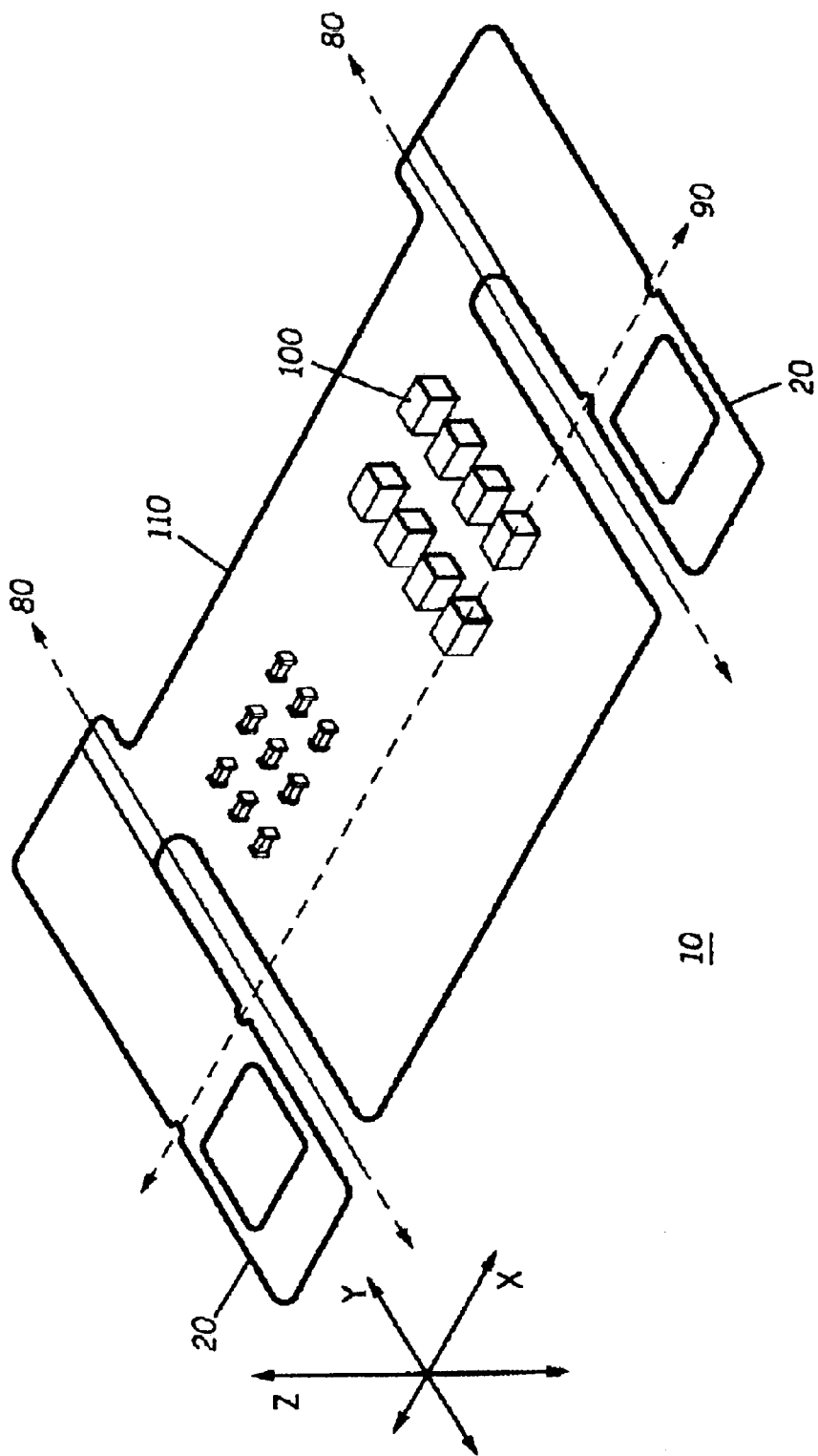
FIG. 1 illustrates a prior art flexible circuit with circuitry disposed thereon.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Typical rechargeable batteries employed in portable communications devices comprise a rechargeable battery cell, circuitry for charging and safety, and a substrate upon which the circuitry resides. The circuit substrate is often a "flexible circuit" comprised of flexible copper disposed between a flexible insulator like KAPTON® manufactured by DuPont. By way of example, U.S. Pat. No. 6,153,834, assigned to Motorola, describes an illustrative example such a battery.

Referring now to FIG. 1, illustrated therein is a prior art flexible circuit 10 with circuitry 100 disposed thereon. The flexible circuit 10 includes tabs 20 on either side of the flexible circuit, and circuitry components. The flexible circuit may be made of, for instance, copper traces sandwiched between two layers of MYLAR® or KAPTON®. Tab 20 can bend along axis 80, and along axis 90.

Figure 2:
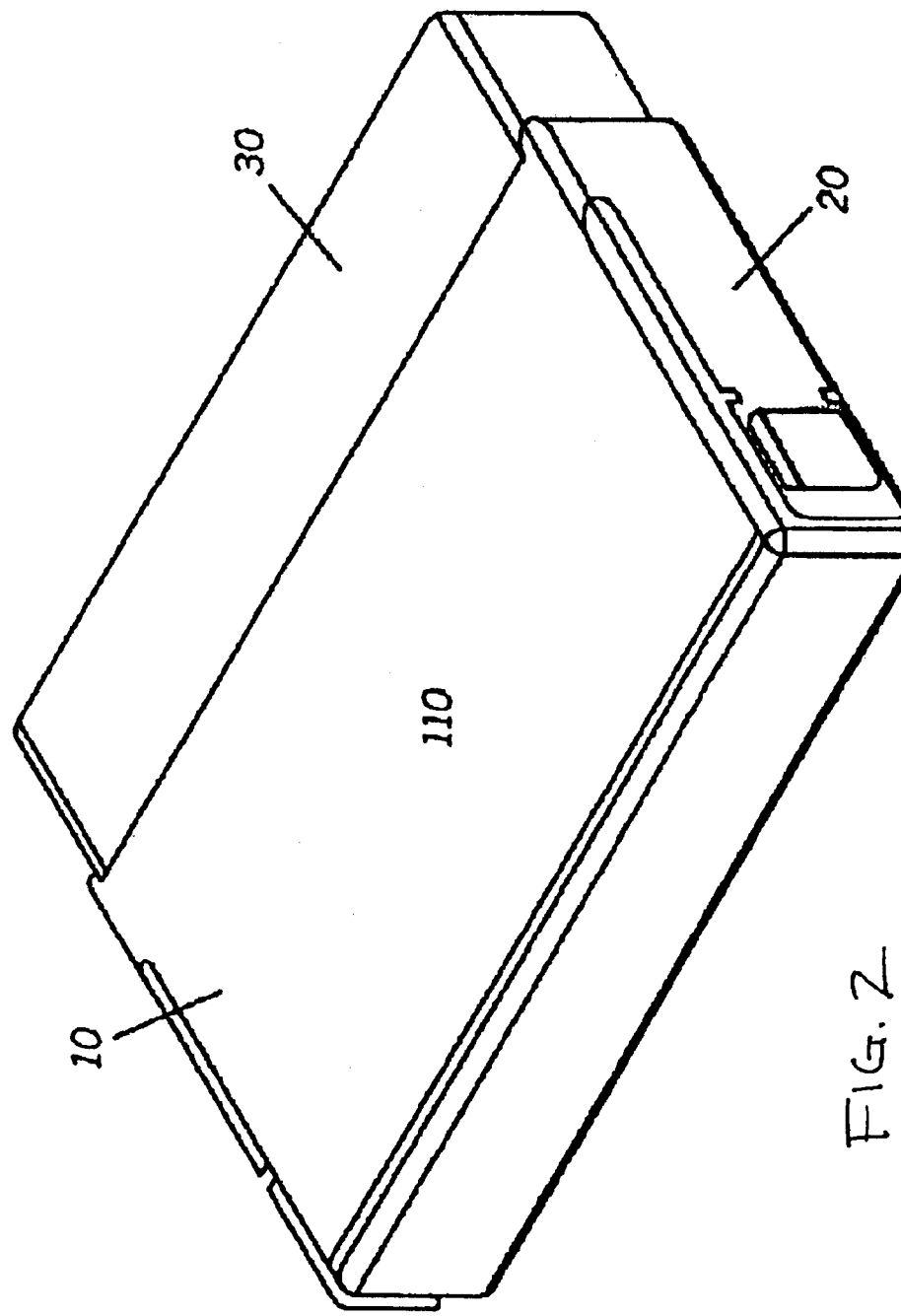
FIG. 2 illustrates the flexible circuit of FIG. 1 coupled to a battery cell.

Referring now to FIG. 2, illustrated therein is the flexible circuit 10 coupled to a battery cell 30. Metal tabs are provided along sides of the battery cell. The twin axes of bending of the flexible circuit tabs 20 allow the flexible circuit tabs 20 to be bent to lie along the battery cell tabs. The battery cell tabs, can now be pinch welded to circuit tabs 20. Therefore, pinch or series welding can be performed between the battery cell tabs and the flexible circuit tabs 20, resulting in high strength welds.

Research leading to the present invention has shown that the battery configuration, flexible circuit geometry and placement, and housing materials will affect the macroscopic SAR of a phone with the battery coupled to it. In other words, if an engineer moves the flexible circuit from one side to the other, the SAR of the phone battery combination will be impacted. It is believed that this is due to RF resonant components, like the flexible circuit itself. One object of the present invention is a battery, that when coupled to a portable electronic device, reduces the SAR of the phone battery combination in comparison to the SAR of a phone with a prior art battery.

Figure 3:
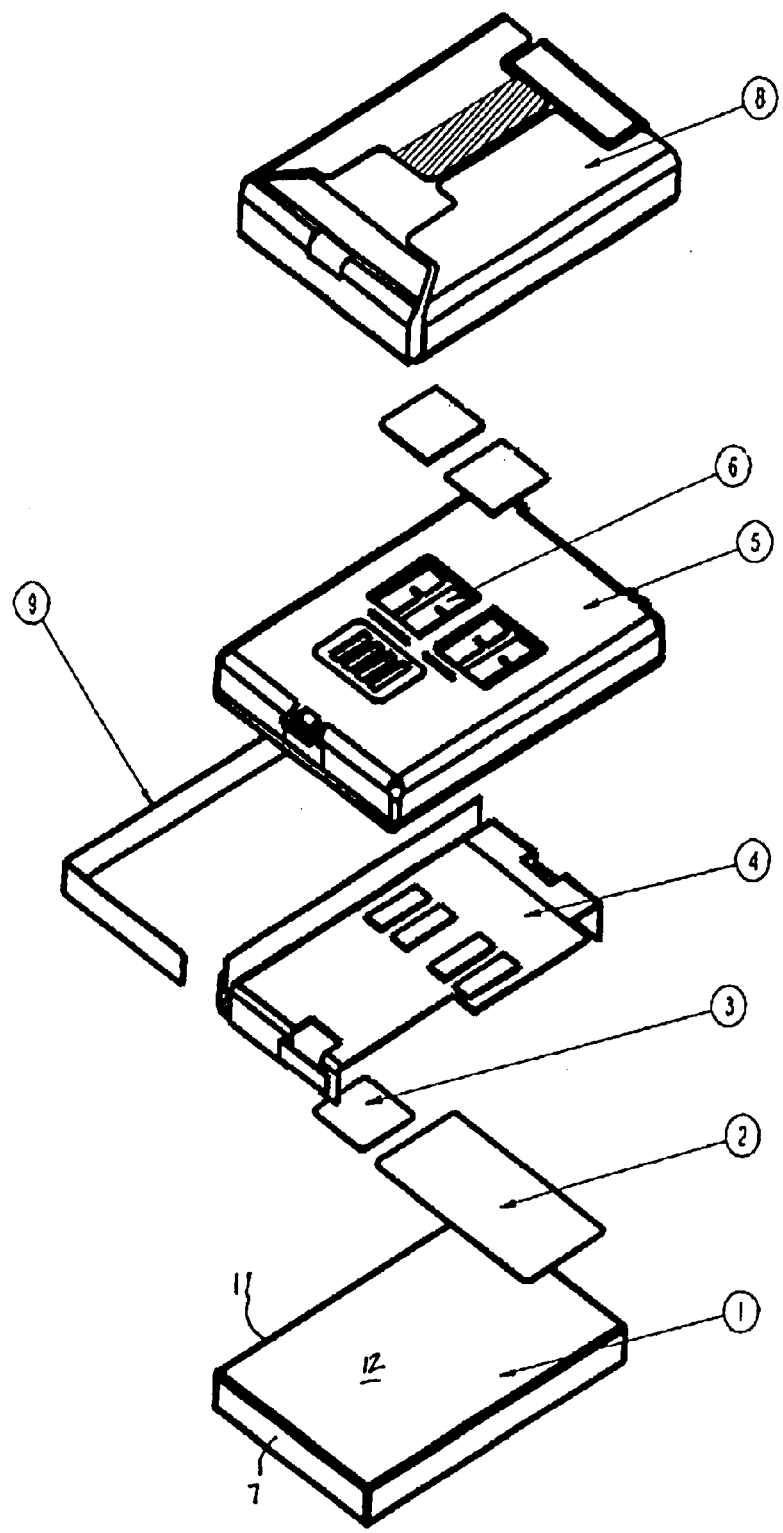
FIG. 3 illustrates one preferred embodiment of a battery pack in accordance with the invention.

Referring now to FIG. 3, illustrated therein is one preferred embodiment of a battery pack in accordance with the invention. A rechargeable battery cell 1 is provided. A first piece of adhesive 2 is included, the first adhesive 2 being used for mechanically coupling the flexible circuit 3 to the face 12 of the cell 1. A plastic housing 6 is included to protect the final battery assembly. A label 8 is optionally provided to include information such as manufacturer, cell type, charging information and the like.

The battery pack also includes a copper strip 9 that is coupled about the cell-flexible circuit assembly by way of a second piece of adhesive 3. In this preferred embodiment, the copper strip 9 is "L"-shaped, running from the end 7 of the cell 1 around the side 11 of the cell. The length of the copper strip 9 is tuned so as to reduce the SAR of the overall electronic device-battery combination. A preferred length of the strip 9 is at a minimum the length of the end 7 of the cell 1. A preferred maximum length is the circumference of the cell 1, equal to twice the length of the end 7 plus twice the length of the side 11. It is believed that the tuning causes the copper strip 9 to radiate with destructive RF harmonics, thereby reducing overall SAR. The copper strip appears to reflect, absorb and redistribute RF energy, in addition to potentially minimizing stray current loops of RF origin, to improve the overall SAR performance of the phone-battery combination.

In this preferred embodiment, the copper strip 9 is electrically insulated from the other battery components, including the flexible circuit 4 and the battery cell 1. The insulation may be accomplished by sheathing the copper strip with either MYLAR® or KAPTON®. The second piece of non-conductive adhesive 3 is used to keep the copper strip 9 mechanically in place in the field.

Laboratory and field experiments were conducted with a phone transmitting according to the Global Standard for Mobile communications (GSM) in the 900 and 1800 MHz spectra. Sample sets of 5 prior art batteries were coupled to the phone and failed global SAR limits with an average SAR of 1.69 mW/g across the GSM spectrum. Further, the SAR levels were asymmetric in that the right and left sides of the model head (see SAM below) were different (1.69 mW/g in the right and around 1.5 mW/g in the left).

As an explanatory note, it is known in the art that the SAR is measured using a head phantom (shaped like a human head) called a "specific anthropomorphic mannequin" (SAM) phantom. The parameters of SAM are derived from the 90th percentile of a survey of American male military service personnel and represent an average male head. SAM has ears, a nose and other facial features. SAM is filled with fluid in accordance with IEEE standard P1528. More information on the SAR test process and SAM is found at the website www.ce-mag.com/archive/03/01miller.html, which is incorporated herein by reference.

In addition to the high SAR levels of the prior art battery-communications device combination, the transmitted power level of the phone-prior art battery combination was high at 34.8 dBm. RF efficiency tests showed an efficiency of approximately 35%. The Bit Error Rate (BER) across the GSM spectrum was 1.8%.

A copper strip like that shown in FIG. 3 was then added to the battery pack in a sample set of 5 batteries. The strip was 70 mm long and 3 mm wide, using 1 oz. copper sheathed with KAPTON®. The copper strip was L-shaped, and placed about the end and side of the cell as shown in FIG. 3. The copper strip ran along the entire 50 mm side of the cell, while 20 mm of the strip wrapped about the end of the cell having the positive terminal. The length was determined experimentally, by trying different lengths to establish the lowest transmitted power level. The range of effective lengths was 60 mm to 80 mm. The range of effective widths was 1 mm to 4 mm.

In addition to the variation in the length of the strip, the placement of the copper strip was varied to further reduce the transmitted power level. The 70 mm×3 mm strip, coupled with the placement of FIG. 3, yielded very satisfactory (and much improved) transmitted power level in terms of the amplitude and the "flatness" or consistency of the level across the GSM spectrum. Using GSM simulators, the 70 mm×3 mm optimizer yielded a transmitted power reduction of approximately 0.7 to 1 dBm. By comparison, a length of 75 mm by 3 mm would give a transmitted power reduction of approximately 1.3 to 1.5 dBm.

It The battery (in accordance with the invention) was then coupled to the phone and tested. While the phone configuration was unchanged, the SAR level of the phone-battery combination dropped to 1.48 mW/g, a reduction of 13%. Additionally, the transmitted power dropped to 34.1 dBm, an improvement of 2% across the spectrum. In the 1800 MHz band, an improvement of nearly 1 dBm occurred. The SAR became symmetric between the right and left heads, with a level of 1.5 mW/g in the left head and 1.48 mW/g in the right head.

The battery pack of the present invention offers several advantages over the prior art. To begin, the invention improves phone parameters, including SAR and transmitted power levels. Additionally, the copper strip in the present invention can be tuned to different phone geometries and transmission protocols (including TDMA, CDMA and others). Third, the cost of the copper strip in the battery of the present invention (less than three cents) is lower than other SAR reducing technologies implemented in the phone.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims.

What is claimed is:

1. A battery pack for an electronic communications device, the battery pack comprising:

a. at least one rechargeable battery cell having a positive terminal, a negative terminal an end and a side;

b. electronic circuitry coupled to the at least one rechargeable battery cell;

c. a substrate, wherein the electronic circuitry is disposed upon the substrate; and d. a metal strip, wherein the metal strip is electrically isolated from both the at least one rechargeable cell and the electronic circuitry.

2. The battery pack of claim 1, wherein the length of the metal strip is at least the length of the end of the cell and at most twice the length of the end plus twice the length of the side.

3. The battery pack of claim 2, wherein the length of the metal strip is between 60 mm and 80 mm.

4. The battery pack of claim 2, wherein the width of the metal strip is between 1 mm and 4 mm.

5. The battery pack of claim 2, wherein the metal strip is manufactured of 1-ounce copper disposed between layers of insulating film.

6. The battery pack of claim 2, wherein the length of the metal strip is between the length of the end of the cell and the length of the end of the cell plus the length of the side of the cell.

7. The battery pack of claim 6, wherein the metal strip is bent in a L-shape.

8. The battery pack of claim 7, the metal strip is disposed about one end and one side of the rechargeable cell, wherein the one end includes the positive terminal.

9. The battery pack of claim 8, wherein the in strip is mechanically coupled to the rechargeable cell by adhesive.

* * * * *